US012593151B2

(12) United States Patent
Jun et al.

(10) Patent No.: US 12,593,151 B2
(45) Date of Patent: *Mar. 31, 2026

(54) ANALOG-TO-DIGITAL CONVERTING CIRCUIT FOR OPTIMIZING DUAL CONVERSION GAIN OPERATION AND OPERATION METHOD THEREOF

(71) Applicant: SAMSUNG ELECTRONICS CO., LTD., Suwon-si (KR)

(72) Inventors: Jaehoon Jun, Suwon-si (KR); Hyukbin Kwon, Hwaseong-si (KR); Woong Joo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/788,084

(22) Filed: Jul. 29, 2024

(65) Prior Publication Data

US 2024/0388813 A1 Nov. 21, 2024

Related U.S. Application Data

(63) Continuation of application No. 17/973,149, filed on Oct. 25, 2022, now Pat. No. 12,063,447.

(30) Foreign Application Priority Data

Nov. 25, 2021 (KR) ........................ 10-2021-0164970
May 16, 2022 (KR) ........................ 10-2022-0059736

(51) Int. Cl.
*H04N 25/78* (2023.01)
*H04N 25/709* (2023.01)

(52) U.S. Cl.
CPC ........... *H04N 25/78* (2023.01); *H04N 25/709* (2023.01)

(58) Field of Classification Search
CPC .... H04N 25/709; H04N 25/778; H04N 25/78; H04N 25/772; H04N 25/616; H04N 25/75

(Continued)

(56) References Cited

U.S. PATENT DOCUMENTS 9,041,581 B2 * 5/2015 Wolfs .................... H03M 1/185 341/164
9,363,450 B2 6/2016 Nakamura et al.

(Continued)

OTHER PUBLICATIONS

Vogelmann et al., "A 1.1mW 200kS/s Incremental ΔΣ ADC with a DR of 91.5dB Using Integrator Slicing for Dynamic Power Reduction," IEEE International Solid- State Circuits Conference, Feb. 2018, pp. 236-238.

*Primary Examiner* — Pritham D Prabhakher
(74) *Attorney, Agent, or Firm* — Fish & Richardson P.C.

(57) ABSTRACT

Disclosed is a circuit which includes a first amplifier that generates a first output signal by comparing a first pixel signal corresponding to a first conversion gain and a first ramp signal and generates a second output signal by comparing a second pixel signal corresponding to a second conversion gain and a second ramp signal, and a second amplifier that generates a third output signal based on the first output signal and generates a fourth output signal based on the second output signal, the first conversion gain is higher than the second conversion gain, and a first power current of the first amplifier when the first pixel signal and the first ramp signal are compared is different from a second power current of the first amplifier when the second pixel signal and the second ramp signal are compared.

20 Claims, 13 Drawing Sheets

(58) Field of Classification Search
USPC .................................................... 348/207.99
See application file for complete search history.

(56) References Cited

U.S. PATENT DOCUMENTS

| | | | | |
|---|---|---|---|---|
| 9,876,978 | B2 | 1/2018 | Okada | |
| 10,194,106 | B2 | 1/2019 | Shim et al. | |
| 10,205,903 | B2 * | 2/2019 | Koifman | H04N 25/78 |
| 10,397,500 | B1 | 8/2019 | Xu et al. | |
| 10,431,608 | B2 | 10/2019 | Ebihara | |
| 10,432,879 | B2 | 10/2019 | Chang et al. | |
| 10,455,162 | B2 | 10/2019 | Singh et al. | |
| 10,615,190 | B2 | 4/2020 | Ebihara | |
| 10,616,518 | B2 * | 4/2020 | Jung | H04N 25/616 |
| 10,735,676 | B2 | 8/2020 | Takane | |
| 10,979,659 | B2 | 4/2021 | Yang | |
| 11,070,761 | B2 | 7/2021 | Okura | |
| 11,284,017 | B2 * | 3/2022 | Yamashita | H04N 23/741 |
| 11,343,449 | B2 | 5/2022 | Paik et al. | |
| 11,528,439 | B2 | 12/2022 | Kim et al. | |
| 2014/0361916 | A1 * | 12/2014 | Wolfs | H03M 1/0617 341/155 |
| 2015/0062364 | A1 | 3/2015 | Nakamura et al. | |
| 2017/0034467 | A1 | 2/2017 | Okada | |
| 2017/0118430 | A1 * | 4/2017 | Koifman | H04N 25/78 |
| 2017/0318246 | A1 | 11/2017 | Shim et al. | |
| 2018/0302578 | A1 | 10/2018 | Ebihara | |
| 2019/0045152 | A1 * | 2/2019 | Ramakrishnan | H04N 25/78 |
| 2019/0116331 | A1 * | 4/2019 | Jung | H04N 25/78 |
| 2019/0222780 | A1 | 7/2019 | Chang et al. | |
| 2019/0230294 | A1 | 7/2019 | Singh et al. | |
| 2019/0306449 | A1 * | 10/2019 | Ramakrishnan | H03F 3/72 |
| 2019/0371828 | A1 | 12/2019 | Ebihara | |
| 2020/0195870 | A1 | 6/2020 | Shim et al. | |
| 2020/0236318 | A1 | 7/2020 | Okura | |
| 2020/0314374 | A1 | 10/2020 | Yang | |
| 2021/0250530 | A1 | 8/2021 | Paik et al. | |
| 2021/0250532 | A1 | 8/2021 | Akiyama et al. | |
| 2021/0266485 | A1 * | 8/2021 | Kobayashi | H03F 3/082 |
| 2021/0274121 | A1 | 9/2021 | Kim et al. | |
| 2021/0306571 | A1 * | 9/2021 | Yamashita | H04N 25/78 |
| 2022/0191423 | A1 | 6/2022 | Bohannon | |

* cited by examiner

ANALOG-TO-DIGITAL CONVERTING CIRCUIT FOR OPTIMIZING DUAL CONVERSION GAIN OPERATION AND OPERATION METHOD THEREOF

CROSS-REFERENCE TO RELATED APPLICATIONS

This application is a continuation of U.S. application Ser. No. 17/973,149, filed Oct. 25, 2022, which claims priority under 35 U.S.C. § 119 to Korean Patent Application No. 10-2021-0164970, filed on Nov. 25, 2021, in the Korean Intellectual Property Office, and to Korean Patent Application No. 10-2022-0059736, filed on May 16, 2022, in the Korean Intellectual Property Office. The disclosures of each of the foregoing applications are incorporated by reference herein in their entireties.

BACKGROUND

Embodiments of the present disclosure relate to an analog-to-digital converter, and more particularly, relate to an analog-to-digital converting circuit for optimizing a dual conversion gain operation and an operation method thereof.

Types of image sensors include charge coupled device (CCD) image sensors, complementary metal-oxide semiconductor (CMOS) image sensors (CISs), etc. The CMOS image sensor generates pixel values using CMOS transistors to generate electrical signals by converting light energy into the electrical signal with a photoelectric conversion element (or device) included for each pixel. The CMOS image sensor obtains information about a captured/photographed image by using the electrical signal generated for each pixel.

An analog-to-digital converter (ADC) receives an analog input voltage generated for a pixel and converts the received analog input voltage into a digital signal. The converted digital signal may be provided to other devices. The ADC may be used in various signal processing devices. As the performance of signal processing devices is improved, nowadays, an improved resolution for an analog signal is required. As such, there is used an ADC capable of processing many signals simultaneously or within the same period or providing an improved resolution for each signal. However, the ADC causes an increase of power consumption.

SUMMARY

Embodiments of the present disclosure provide an analog-to-digital converting circuit for optimizing current consumption of a dual conversion gain operation and a time taken to perform the dual conversion gain operation, an operation method thereof, and an image sensor including the same.

According to some embodiments, a circuit includes a first amplifier configured to generate a first output signal by comparing a first pixel signal corresponding to a first conversion gain and a first ramp signal and to generate a second output signal by comparing a second pixel signal corresponding to a second conversion gain and a second ramp signal, and a second amplifier configured to generate a third output signal based on the first output signal and generate a fourth output signal based on the second output signal, and a counter configured to count pulses of the third output signal and the fourth output signal and to output a counting result as a digital signal. The first conversion gain is higher than the second conversion gain. A first power current of the first amplifier when the first pixel signal and the first ramp signal are compared is different from a second power current of the first amplifier when the second pixel signal and the second ramp signal are compared.

According to some embodiments, an image sensor includes a pixel array configured to output a first pixel signal corresponding to a first conversion gain and a second pixel signal corresponding to a second conversion gain from pixels sharing a floating diffusion region, a ramp signal generator configured to generate a first ramp signal and a second ramp signal, and an analog-to-digital converting circuit configured to output a digital signal based on the first pixel signal and the second pixel signal. The analog-to-digital converting circuit includes an amplifier configured to generate a first output signal by comparing the first pixel signal and the first ramp signal and generate a second output signal by comparing the second pixel signal and the second ramp signal. The first conversion gain is higher than the second conversion gain. A first power current of the amplifier when the first pixel signal and the first ramp signal are compared is different from a second power current of the amplifier when the second pixel signal and the second ramp signal are compared.

According to some embodiments, an analog-to-digital converting circuit includes an amplifier. An operation method of the analog-to-digital converting circuit includes generating, at the amplifier, a first output signal by comparing a first pixel signal corresponding to a first conversion gain and a first ramp signal based on a first power current, generating, at the amplifier, a second output signal by comparing a second pixel signal corresponding to a second conversion gain and a second ramp signal based on a second power current, and adjusting a power current of the amplifier, and the first conversion gain is higher than the second conversion gain.

According to some embodiments, a circuit includes a first transistor configured to receive a first pixel signal corresponding to a first conversion gain and a second pixel signal corresponding to a second conversion gain, a second transistor configured to receive a first ramp signal and a second ramp signal, a first current source that is connected with a first source terminal of the first transistor and a second source terminal of the second transistor at a common node and configured to output a first sub power current, a switch that is connected with the first source terminal and the second source terminal at the common node, and a second current source that is connected with the switch and configured to output a second sub power current. The first conversion gain is higher than the second conversion gain. A first power current of the circuit when the first pixel signal and the first ramp signal are compared is different from a second power current of the circuit when the second pixel signal and the second ramp signal are compared. When the first pixel signal and the first ramp signal are compared, the switch is turned on, and the first power current is equal to a sum of the first sub power current and the second sub power current. When the second pixel signal and the second ramp signal are compared, the switch is turned off, and the second power current is equal to the first sub power current. A first output signal is generated by comparing the first pixel signal and the first ramp signal, and a second output signal is generated by comparing the second pixel signal and the second ramp signal.

BRIEF DESCRIPTION OF THE FIGURES

The above and other objects and features of the present disclosure will become apparent by describing in detail embodiments thereof with reference to the accompanying drawings.

FIG. 4B is a circuit diagram illustrating a floating diffusion region under a low conversion gain condition in which a dual conversion transistor of the pixel group of FIG. 3 is turned on.

DETAILED DESCRIPTION

Below, embodiments of the present disclosure will be described in detail and clearly to such an extent that one skilled in the art easily carries out the teachings of the present disclosure.

In the detailed description, components described with reference to the terms "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
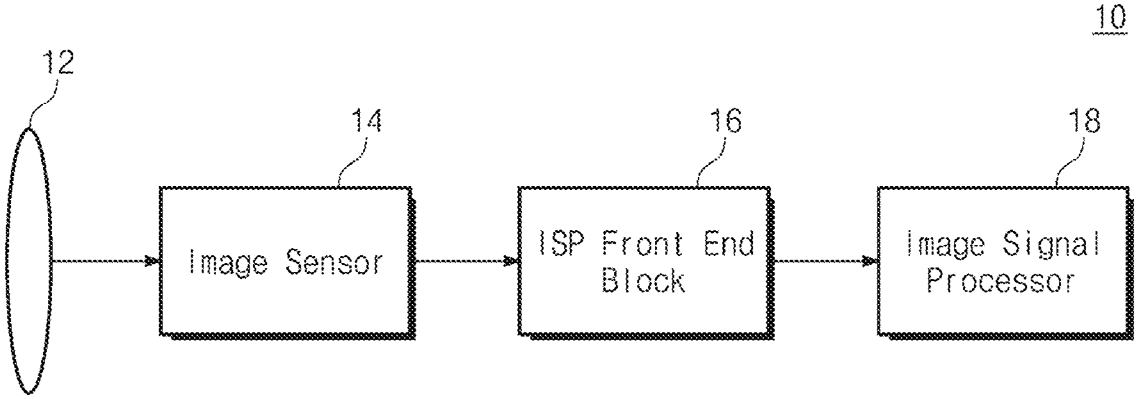
FIG. 1 illustrates an example of a configuration of an image processing block according to an embodiment of the present disclosure.

FIG. 1 illustrates an example of a configuration of an image processing block 10 according to an embodiment of the present disclosure. The image processing block 10 may be implemented as a part of various electronic devices such as a smartphone, a digital camera, a laptop computer, and a desktop computer. The image processing block 10 may include a lens 12, an image sensor 14, an ISP front end block 16 (image signal processor front end block), and an image signal processor 18.

A light may be reflected by an object, a scenery, etc. targeted for photographing, and the lens 12 may receive the reflected light. The image sensor 14 may generate an electrical signal based on the light received through the lens 12. For example, the image sensor 14 may be implemented with a complementary metal-oxide semiconductor (CMOS) image sensor or the like. For example, the image sensor 14 may be a multi-pixel image sensor having a dual pixel structure or a tetracell structure.

The image sensor 14 may include a pixel array. The pixel array may convert a light into electrical signals and may generate pixel values for each pixel. A ratio at which a light is converted into an electrical signal (e.g., a voltage) may be defined as a conversion gain. In particular, the pixel array may generate pixel signals under a low conversion gain condition and a high conversion gain condition, by using a change of the conversion gain, that is, a dual conversion gain.

In addition, the image sensor 14 may include an analog-to-digital converting (ADC) circuit for performing a correlated double sampling (CDS) operation on the pixel values. A configuration of the image sensor 14 will be described in detail with reference to FIG. 2.

The ISP front end block 16 may perform pre-processing on an electrical signal output from the image sensor 14 so that the input to the image signal processor 18 is appropriate for processing by the image signal processor 18. Also, the ISP front end block 16 of the present disclosure may selectively perform pre-processing for an (e.g., first) electrical signal corresponding to the low conversion gain condition and pre-processing for an (e.g., second) electrical signal corresponding to the high conversion gain condition, based on an output of the image sensor 14.

The image signal processor 18 may generate image data associated with the photographed object or scenery by appropriately processing the electrical signal pre-processed by the ISP front end block 16. To this end, the image signal processor 18 may perform various processing operations such as color correction, auto white balance, gamma correction, color saturation correction, formatting, bad pixel correction, and hue correction.

One lens 12, one image sensor 14 and one ISP front end block 16 are illustrated in FIG. 1. However, in another embodiment, the image processing block 10 may include a plurality of lenses, a plurality of image sensors, and a plurality of ISP front end blocks. In this case, the plurality of lenses may have different fields of view. Also, the plurality of image sensors may have different functions, different performances, and/or different characteristics, and may respectively include pixel arrays of different configurations.

Figure 2:
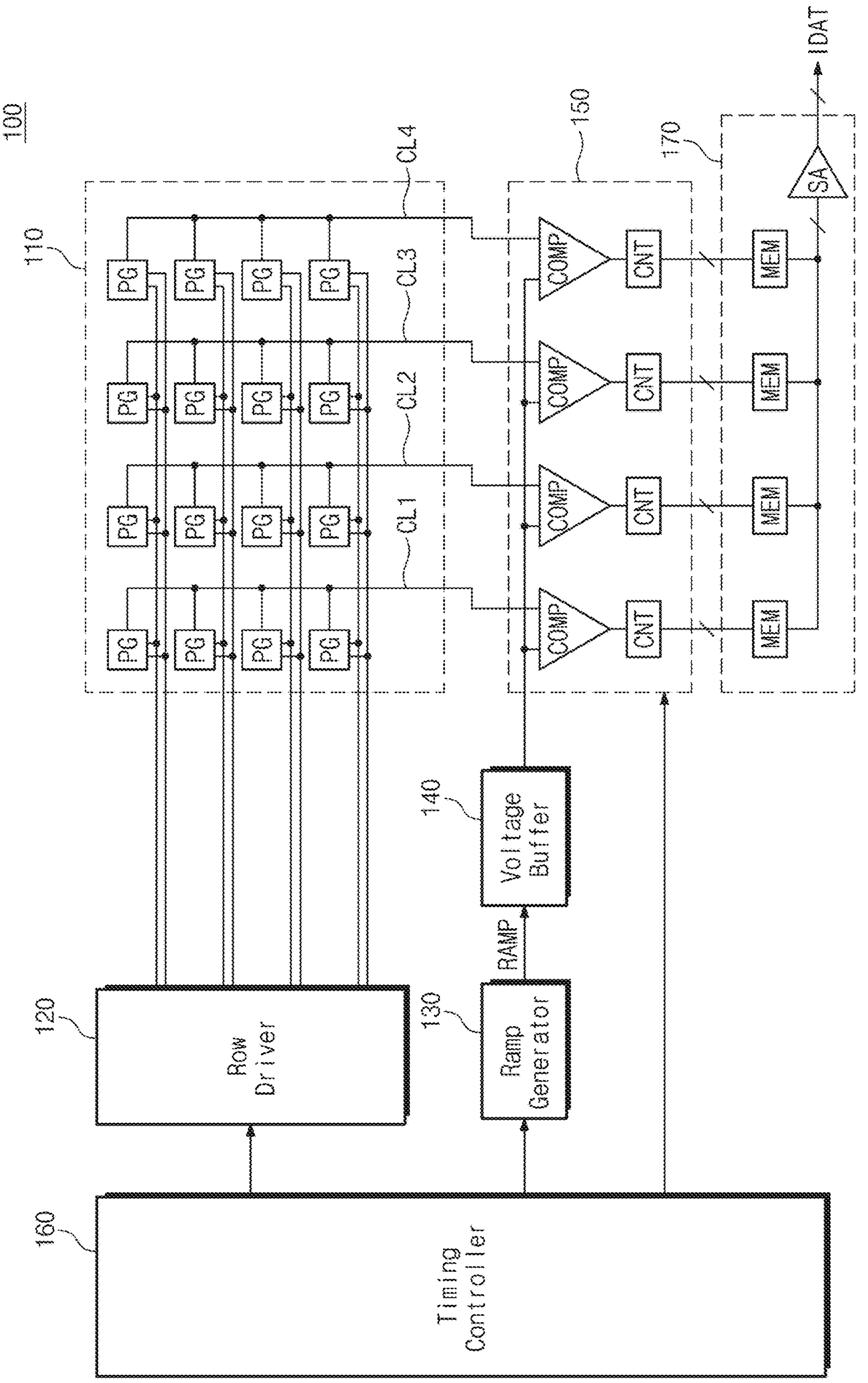
FIG. 2 illustrates an example of a configuration of an image sensor of the image processing block of FIG. 1.

FIG. 2 illustrates an example of a configuration of the image sensor 14 of the image processing block of FIG. 1. An image sensor 100 may correspond to the image sensor 14 in FIG. 1 and may include a pixel array 110, a row driver 120, a ramp signal generator 130, a voltage buffer 140, an ADC circuit 150, a timing controller 160, and a buffer 170.

The pixel array 110 may include a plurality of pixels arranged in the form of a matrix, that is, arranged along rows and columns. In the context of a pixel array 110, references to pixels should be understood as references to a discrete hardware circuit element or a discrete combination of hardware circuit elements for each pixel represented in the pixel array. Each of the plurality of pixels may include a photoelectric conversion element. For example, the photoelectric conversion element may include a photo diode, a photo transistor, a photo gate, a pinned photo diode, or the like.

The pixel array 110 may include a plurality of pixel groups PG. Each pixel group PG may include two or more pixels, that is, a plurality of pixels. A plurality of pixels constituting the pixel group PG may share one floating diffusion region or a plurality of floating diffusion regions. An example in which the pixel array 110 includes the pixel groups PG arranged in the form of a matrix with four rows and four columns (i.e., includes 4×4 pixel groups PG) is illustrated in FIG. 2. However, the present disclosure is not limited thereto.

The pixel group PG may include pixels of the same color. For example, pixels of the pixel group PG may include a red pixel to convert a light of a red spectrum into an electrical signal, a green pixel to convert a light of a green spectrum into an electrical signal, or a blue pixel to convert a light of a blue spectrum into an electrical signal. For example, the pixels constituting the pixel array 110 may be arranged in the form of a tetra-Bayer pattern.

The pixels of the pixel array 110 may be configured to output pixel signals through column lines CL1 to CL4, depending on the intensity or the amount of light received from the outside. For example, the pixel array 110 may be configured to output a first pixel signal corresponding to a first conversion gain and a second pixel signal corresponding to a second conversion gain from pixels sharing a floating diffusion region. For example, the pixel signal may be an analog signal corresponding to the intensity or the amount of light received from the outside.

As described with reference to FIG. 1, the pixel array 110 may generate pixel signals under the low conversion gain condition and the high conversion gain condition depending on ambient luminance of an object. Below, a pixel signal generated under the low conversion gain condition may be referred to as a low conversion gain pixel signal, and a pixel signal generated under the high conversion gain condition may be referred to as a high conversion gain pixel signal. The pixel signals may pass through voltage buffers (e.g., source followers) and may then be provided to the ADC circuit 150 through the column lines CL1 to CL4. The ADC circuit 150 may be configured to output a digital signal based on the pixel signals, such as based on the first pixel signal corresponding to a first conversion gain or based on the second pixel signal corresponding to a second conversion gain. The pixel array 110 may change the conversion gain by turning on or turning off a dual conversion transistor, which will be described in detail with reference to FIG. 3, FIG. 4A, and FIG. 4B.

The row driver 120 may select and drive a row of the pixel array 110. The row driver 120 may decode an address and/or a control signal generated by the timing controller 160 and may generate control signals for selecting and driving a row of the pixel array 110. For example, the control signals may include a signal for selecting a pixel, a signal for resetting a floating diffusion region, etc.

The ramp signal generator 130 may generate a ramp signal RAMP under control of the timing controller 160. For example, the ramp signal generator 130 may operate in response to a control signal such as a ramp enable signal. When the ramp enable signal is activated, the ramp signal generator 130 may generate the ramp signal RAMP depending on preset values (e.g., a start level, an end level, and a slope). In other words, the ramp signal RAMP may be a signal that increases or decreases along a preset slope during a specific time. The ramp signal RAMP may be provided to the ADC circuit 150 through the voltage buffer 140.

The ADC circuit 150 may receive pixel signals from a plurality of pixels through the column lines CL1 to CL4. The ADC circuit 150 may receive the ramp signal RAMP from the ramp signal generator 130 through the voltage buffer 140. The ADC circuit 150 may operate based on a correlated double sampling (CDS) technique for obtaining a reset signal and an image signal from the received pixel signal and extracting a difference between the reset signal and the image signal as an effective signal component. The ADC circuit 150 may include a plurality of comparators COMP and a plurality of counters CNT.

In detail, each of the comparators COMP may compare the reset signal of the pixel signal and the ramp signal RAMP, may compare the image signal of the pixel signal and the ramp signal RAMP, and may perform correlated double sampling (CDS) on comparison results. Each of the counters CNT may count pulses of the signal experiencing the correlated double sampling and may output a counting result as a digital signal. An example in which the ADC circuit 150 includes four comparators COMP and four counters CNT is illustrated in FIG. 2, but the present disclosure is not limited thereto.

Also, the ADC circuit 150 of the present disclosure may make the current consumption in the comparison operation for the low conversion gain pixel signal and the current consumption in the comparison operation for the high conversion gain pixel signal different. In addition, the ramp signal generator 130 may generate the ramp signal RAMP in the comparison operation for the low conversion gain pixel signal and the ramp signal RAMP in the comparison operation for the high conversion gain pixel signal, so as to be different from each other. Also, even though pixel signals have the same conversion gain, the ramp signal RAMP may be differently generated in the comparison operation for the reset signal and the comparison operation for the image signal.

The timing controller 160 may generate a control signal and/or a clock for controlling an operation and/or a timing of each of the row driver 120, the ramp signal generator 130, and the ADC circuit 150.

The buffer 170 may include memories MEMs and a sense amplifier SA. The memories MEM may store digital signals output from the corresponding counters CNT of the ADC circuit 150. The sense amplifiers SA may sense and amplify the digital signals stored in the memories MEMs. The sense amplifiers SA may output the amplified digital signals as image data IDAT. The image data IDAT may be provided to the ISP front end block 16 of FIG. 1.

Figure 3:
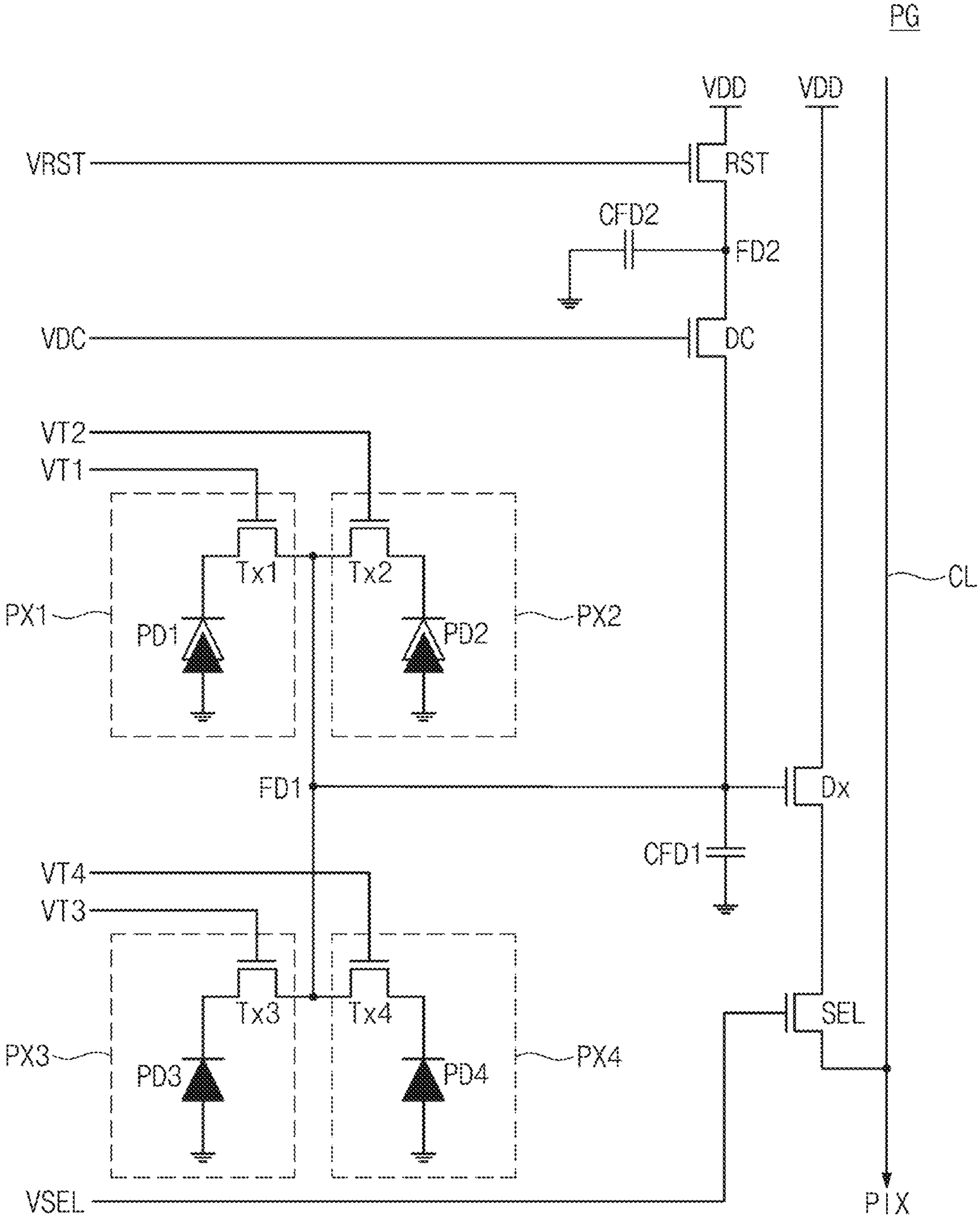
FIG. 3 is a circuit diagram illustrating an example of one pixel group among pixel groups of a pixel array of the image sensor of FIG. 2.
Figure 4A:
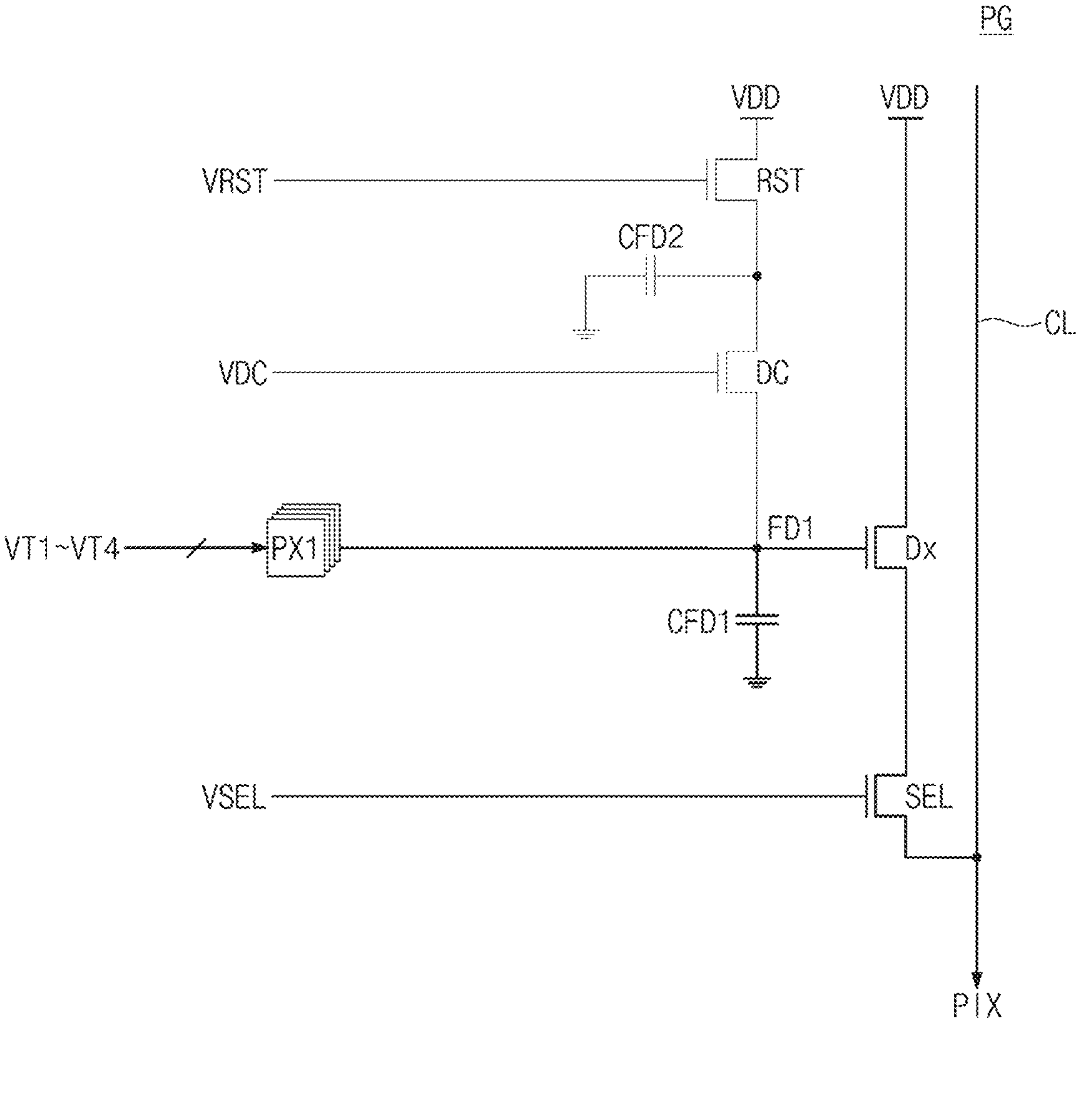
FIG. 4A is a circuit diagram illustrating a floating diffusion region under a high conversion gain condition in which a dual conversion transistor of the pixel group of FIG. 3 is turned off.
Figure 4B:
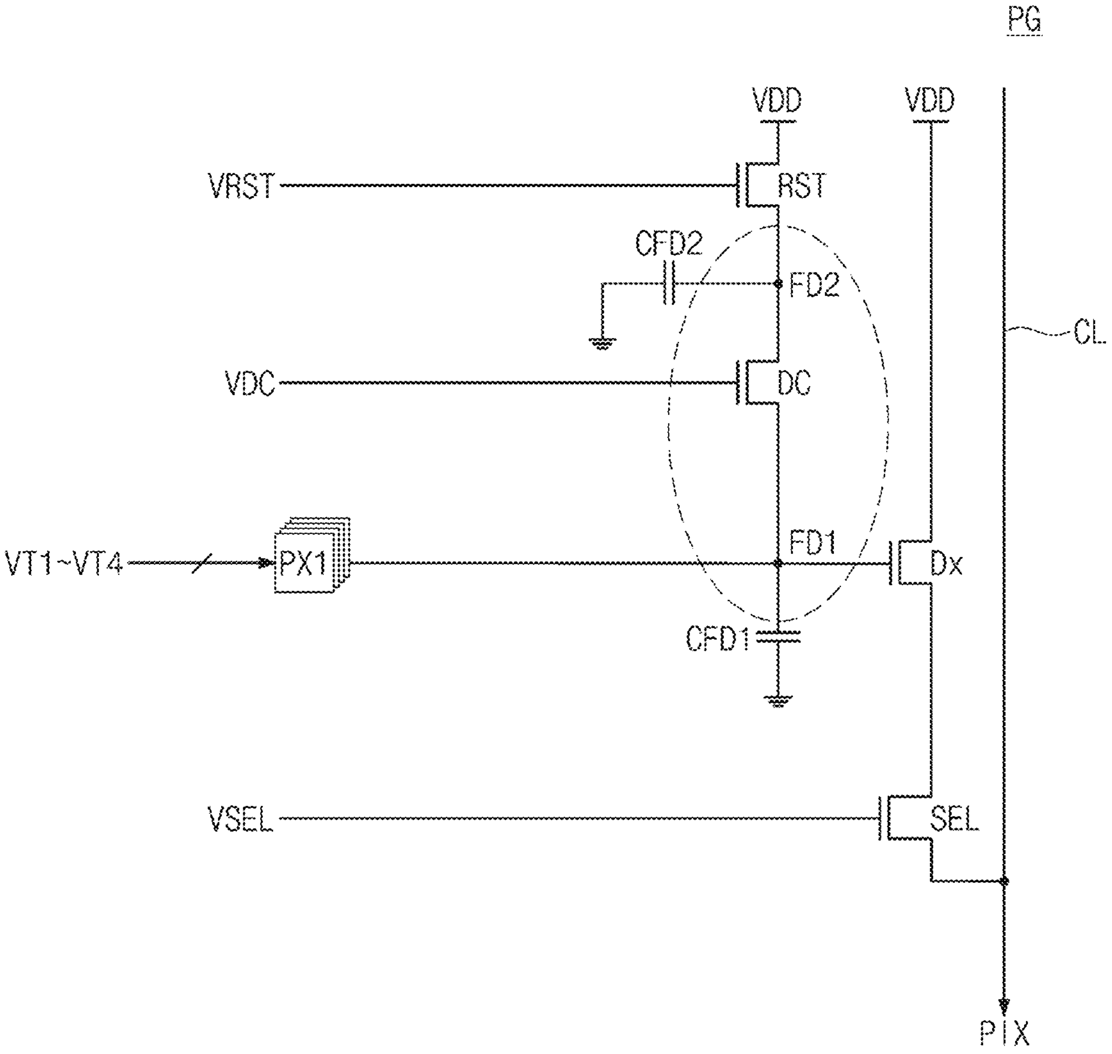

FIG. 3 is a circuit diagram illustrating an example of one of the pixel groups PG of the pixel array 110 of the image sensor of FIG. 2. FIG. 4A is a circuit diagram illustrating a floating diffusion region FD1 under a high conversion gain condition in which a dual conversion transistor DC of the pixel group of FIG. 3 is turned off. FIG. 4B is a circuit diagram illustrating floating diffusion regions FD1 and FD2 under a low conversion gain condition in which the dual conversion transistor DC of the pixel group of FIG. 3 is turned on.

For example, the pixel group PG may include pixels PX1 to PX4, photoelectric conversion elements PD1 to PD4, transfer transistors Tx1 to Tx4, a reset transistor RST, the dual conversion transistor DC, a drive transistor Dx, and a select transistor SEL. An example in which the pixel group PG has a tetracell structure in which four pixels PX1 to PX4 respectively include photoelectric conversion elements PD1 to PD4 is illustrated in FIG. 3, but the present disclosure is not limited thereto. For example, the pixel group PG may be implemented to have various different structures.

The first pixel PX1 may include the first photoelectric conversion element PD1 and the first transfer transistor Tx1, and each of the remaining pixels PX2, PX3, and PX4 may also include similar components/elements. The pixels PX1 to PX4 may share the reset transistor RST, the dual conversion transistor DC, the drive transistor Dx, and the select transistor SEL. Also, the pixels PX1 to PX4 may share the first floating diffusion region FD1.

The first floating diffusion region FD1 or the second floating diffusion region FD2 may accumulate (or integrate) charges corresponding to the amount of incident light. While the transfer transistors Tx1 to Tx4 are respectively turned on by transfer signals VT1 to VT4, the first floating diffusion region FD1 or the second floating diffusion region FD2 may accumulate (or integrate) charges supplied from the photoelectric conversion elements PD1 to PD4. Because the first floating diffusion region FD1 is connected with a gate terminal of the drive transistor Dx operating as a source follower amplifier, a voltage corresponding to the charges accumulated in the first floating diffusion region FD1 may be formed. For example, a capacitance of the first floating diffusion region FD1 is depicted as a first capacitance CFD1.

The dual conversion transistor DC may be driven by a dual conversion signal VDC. When the dual conversion transistor DC is turned off, the capacitance of the first floating diffusion region FD1 may correspond to the first capacitance CFD1. In a normal environment, because the first floating diffusion region FD1 is not easily saturated, there is no need to increase the capacitance (i.e., CFD1) of the first floating diffusion region FD1. In this case, the dual conversion transistor DC may be turned off.

However, in a high-luminance environment, the first floating diffusion region FD1 may be easily saturated. To prevent the saturation, the dual conversion transistor DC may be turned on such that the first floating diffusion region FD1 and the second floating diffusion region FD2 are electrically connected. As shown in each of FIG. 4A and FIG. 4B, each of the first floating diffusion region FD1 and the second floating diffusion region FD2 may be connected to different capacitors representing capacitance values, such that the pixel group PG of the pixel array 110 includes one or more capacitor connected with a floating diffusion region for the purpose of obtaining a first capacitance value CFD1 in the case of the first floating diffusion region FD1 and a second capacitance value CFD2 in the case of the second floating diffusion region FD2. In this case, a capacitance of the floating diffusion regions FD1 and FD2 may be increased to a sum of the first capacitance CFD1 and a second capacitance CFD2. For example, the pixel array 110 may be configured to output a first pixel signal corresponding to a first conversion gain and a second pixel signal corresponding to a second conversion gain from pixels sharing a floating diffusion region. For example, the first pixel signal may correspond to charges stored in the floating diffusion region FD1 having a first capacitance value, and the second pixel signal may correspond to a sum of charges stored in the floating diffusion region FD1 and the second floating diffusion region FD2 having a second capacitance value.

The transfer transistors Tx1 to Tx4 may be respectively driven by the transfer signals VT1 to VT4. The transfer transistors Tx1 to Tx4 may transfer charges generated (or integrated) by the photoelectric conversion elements PD1 to PD4 to the first floating diffusion region FD1 or the second floating diffusion region FD2. For example, first ends of the transfer transistors Tx1 to Tx4 may be respectively connected with the photoelectric conversion elements PD1 to PD4, and second ends thereof may be connected in common with the first floating diffusion region FD1.

The reset transistor RST may be driven by a reset signal VRST and may provide a power supply voltage VDD to the first floating diffusion region FD1 or the second floating diffusion region FD2. As such, the charges accumulated in the first floating diffusion region FD1 or the second floating diffusion region FD2 may move to a terminal for the power supply voltage VDD, and a voltage of the first floating diffusion region FD1 or the second floating diffusion region FD2 may be reset.

The drive transistor Dx may amplify a voltage of the first floating diffusion region FD1 or the second floating diffusion region FD2 and may generate a pixel signal PIX corresponding to a result of the amplification. The select transistor SEL may be driven by a selection signal VSEL and may select pixels to be read in units of row. When the select transistor SEL is turned on, the pixel signal PIX may be output to the ADC circuit 150 of FIG. 2 through a column line CL.

Figure 5:
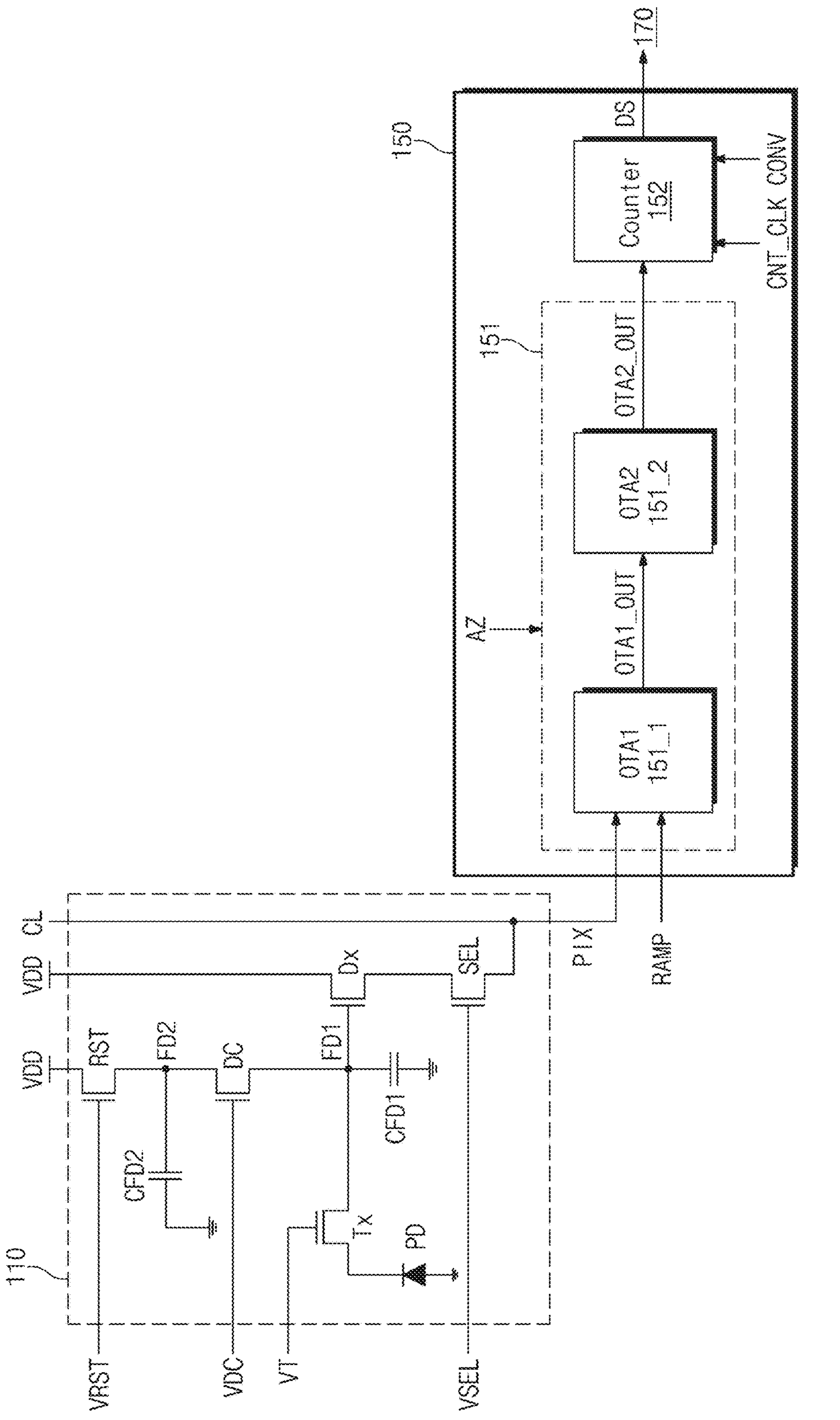
FIG. 5 illustrates an example of a configuration of an analog-to-digital converting circuit of the image sensor of FIG. 2.

FIG. 5 illustrates an example of a configuration of the ADC circuit 150 (analog-to-digital converting circuit) of the image sensor of FIG. 2. The ADC circuit 150 may include a comparator 151 and a counter 152. The ADC circuit 150 may convert and output the analog pixel signal PIX from the pixel array 110 into a digital signal DS. For clearness of description and brevity of drawing, an example in which the pixel array 110 includes only one pixel is illustrated in FIG. 5, and the configuration and function of the pixel array 110 are identical to those described with reference to FIG. 3, FIG. 4A, and FIG. 4B.

In detail, as described with reference to FIG. 2, the comparator 151 may compare the reset signal of the pixel signal PIX and the ramp signal RAMP in a first operation period and in a fourth operation period, may compare the image signal of the pixel signal PIX and the ramp signal RAMP in a second operation period and a third operation period, and may perform correlated double sampling (CDS) on comparison results. The counter 152 may count pulses of a signal experiencing the correlated double sampling (CDS) and may output a counting result as a digital signal. FIG. 5 will be described with reference to FIG. 2, FIG. 3, FIG. 4A, and FIG. 4B.

For example, the comparator 151 may have a two-stage structure including two amplifiers (i.e., a first amplifier 151_1 and a second amplifier 151_2). Each of the first amplifier 151_1 and the second amplifier 151_2 may be implemented as an operational transconductance amplifier (OTA). However, the present disclosure is not limited thereto. For example, the comparator 151 may have a structure including more amplifiers. Also, the ADC circuit 150 may include a plurality of comparators and a plurality of counters, although one comparator 151 and one counter 152 are illustrated in FIG. 5 for clearness of description.

The first amplifier 151_1 may receive the pixel signal PIX from the pixel array 110 through the column line CL, and may receive the ramp signal RAMP from the ramp signal generator 130 through the voltage buffer 140. The first amplifier 151_1 may output a first output signal OTA1_OUT based on the received signals. For example, in a period where a level of the ramp signal RAMP is higher than a level of the pixel signal PIX, the first amplifier 151_1 may output the first output signal OTA1_OUT having a high level. In a period where the level of the ramp signal RAMP is lower than the level of the pixel signal PIX, the first amplifier

151_1 may output the first output signal OTA1_OUT having a low level. Also, the comparison operation of the comparator 151 described above may be performed both when the reset signal of the pixel signal PIX and the ramp signal RAMP are compared by the first amplifier 151_1 and when the image signal of the pixel signal PIX and the ramp signal RAMP are compared by the first amplifier 151_1.

As an example operation of the first amplifier 151_1, the first amplifier 151_1 may be configured to compare a reset signal of the pixel signal and the ramp signal in some operation periods, and may be configured to compare an image signal of the pixel signal and the ramp signal in other operation periods. As one particular example, the first amplifier 151_1 may be configured to: compare a reset signal of a first pixel signal and a first ramp signal in a first operation period; compare an image signal of the first pixel signal and the first ramp signal in a second operation period; compare an image signal of a second pixel signal and a second ramp signal in a third operation period; and compare a reset signal of the second pixel signal and the second ramp signal in a fourth operation period. In another example, the first amplifier 151_1 may be configured to: compare a reset signal of the second pixel signal and the second ramp signal in a first operation period; compare a reset signal of the first pixel signal and the first ramp signal in a second operation period; compare an image signal of the first pixel signal and the first ramp signal in a third operation period; and compare an image signal of the second pixel signal and the second ramp signal in a fourth operation period.

The second amplifier 151_2 may amplify the first output signal OTA1_OUT and may output a second output signal OTA2_OUT as a comparison signal. For example, the second output signal OTA2_OUT may be an inverted version of the first output signal OTA1_OUT. In other words, the second amplifier 151_2 may output the second output signal OTA2_OUT having the low level during the high level of the first output signal OTA1_OUT and may output the second output signal OTA2_OUT having the high level during the low level of the first output signal OTA1_OUT.

In the following description, a transition of a voltage level of the first output signal OTA1_OUT or the second output signal OTA2_OUT from the high level to the low level or from the low level to the high level as the comparator 151 performs the comparison operation may be referred to as a decision of the ADC circuit 150. In other words, the decision of the ADC circuit 150 may refer to when a voltage level of the first output signal OTA1_OUT or the second output signal OTA2_OUT changes from the high level to the low level or from the low level to the high level. In an auto-zero period before the comparison operation is performed, the comparator 151 may be initialized in response to an auto-zero signal AZ and may then again perform the comparison operation.

The counter 152 may operate under control of the timing controller 160, may count pulses of the second output signal OTA2_OUT, and may output a counting result as the digital signal DS. The counter 152 may receive a counter clock signal CNT_CLK and an inversion signal CONV which is used for inverting an internal bit of the counter 152. For example, the counter 152 may operate in response to control signals such as the counter clock signal CNT_CLK and the inversion signal CONV.

For example, the counter 152 may include an up/down counter, a bit-wise inversion counter, etc. An operation of the bit-wise inversion counter may be similar to an operation of the up/down counter. For example, the bit-wise inversion counter may perform a function of performing up-counting only and a function of converting all internal bits of a counter to obtain the 1's complement when a specific signal is input thereto. The bit-wise inversion counter may perform a reset count, and may then invert a reset counting result so as to be converted into the 1's complement, that is, a negative value.

Through the above operation of the ADC circuit 150, a low conversion gain digital signal corresponding to a low conversion gain pixel signal and a high conversion gain digital signal corresponding to a high conversion gain pixel signal may be output. The image data IDAT may be generated based on the low conversion gain digital signal and the high conversion gain digital signal. The image data IDAT thus generated may correspond to a high dynamic range (HDR) image with a high dynamic range. The quality of the HDR image may be determined by a signal-to-noise ratio (SNR) of the image sensor 100.

The SNR may be affected by a magnitude of a signal and a magnitude of a noise; as the signal magnitude becomes greater and the noise magnitude becomes smaller, the SNR may become higher. For example, the signal magnitude may be determined by a level of a power current flowing to the first amplifier 151_1. For example, a noise that is capable of occurring in the process of generating an image may include a thermal noise, a flicker noise, a dark noise, a shot noise, a quantization error, a settling error, etc. In particular, in the low conversion gain condition, the shot noise due to the light may be the most important factor determining the SNR. Also, in the low conversion gain condition, because the shot noise included in the SNR is great, even though the signal magnitude decreases, the SNR may not decrease significantly to such an extent as to influence the quality of image data.

That is, within a range where the quality of image data is uniformly maintained without the great decrease in the SNR, the ADC circuit 150 may be configured such that the current consumption in the comparison operation for the low conversion gain pixel signal is smaller than the current consumption in the comparison operation for the high conversion gain pixel signal. For example, a level of the power current flowing to the first amplifier 151_1 or the second amplifier 151_2 in the comparison operation for the low conversion gain pixel signal may be adjusted to be lower than in the comparison operation for the high conversion gain pixel signal. As such, the current consumption in the dual conversion gain operation may be optimized, and power consumption of the ADC circuit 150 may decrease. The current consumption optimization operation will be described in detail with reference to FIG. 6.

Also, when the ambient luminance of the object is very light, the shot noise may be sufficiently great; in this case, even though the comparison operation for the low conversion gain pixel signal is not completely performed (i.e., even though the correlated double sampling (CDS) for the low conversion gain pixel signal is not completely performed), the quality of image data may not be significantly affected. In this case, a portion of a counting period may be omitted by increasing or decreasing an offset of the ramp signal RAMP upon comparing the image signal of the low conversion gain pixel signal and the ramp signal RAMP. Accordingly, a period of the comparison operation for the low conversion gain pixel signal may be shortened, and a time (hereinafter referred to as a "required time") taken to perform the dual conversion gain operation may decrease. The required time optimization operation will be described in detail with reference to FIG. 7A, FIG. 7B, FIG. 8A, FIG. 8B, and FIG. 8C.

Figure 6:
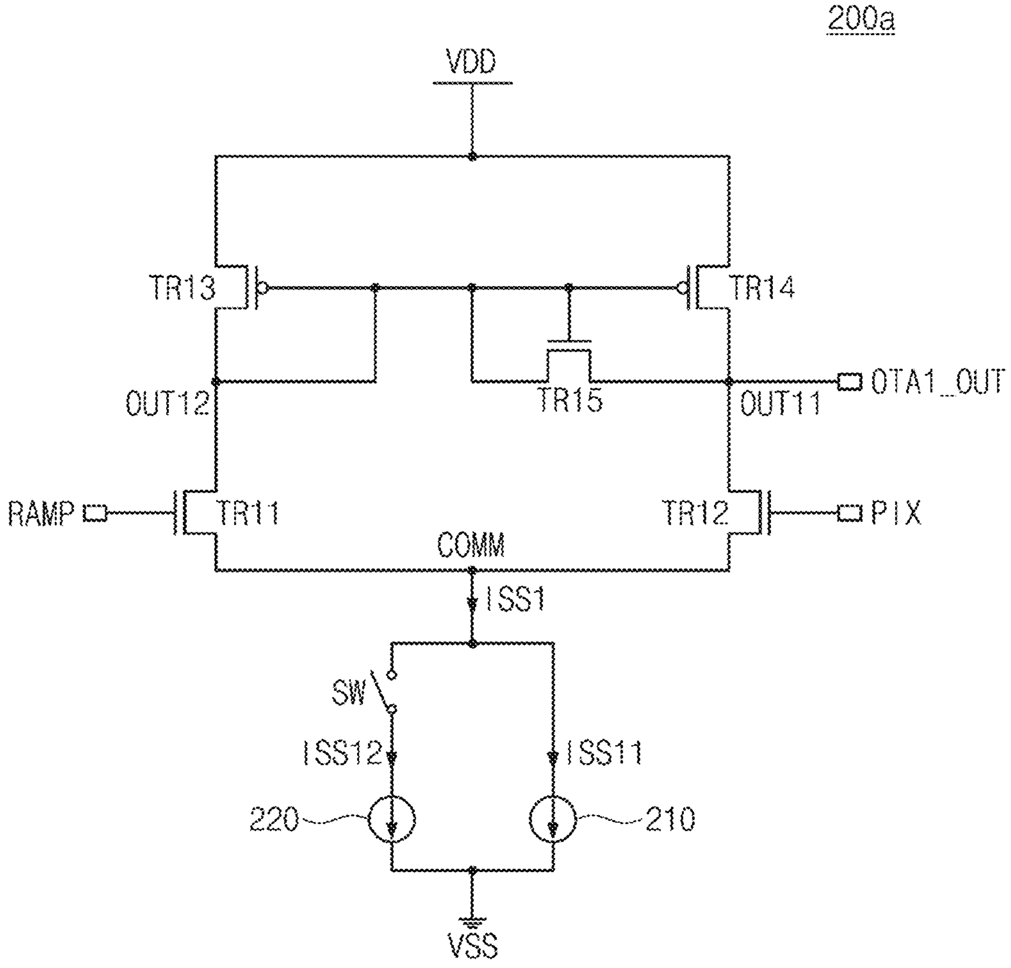
FIG. 6 is a circuit diagram illustrating an example of a first amplifier of the analog-to-digital converting circuit of FIG. 5.

FIG. 6 is a circuit diagram illustrating an example of the first amplifier 151_1 of the ADC circuit 150 of FIG. 5. A first amplifier 200*a* may include a plurality of transistors including a first transistor TR11, a second transistor TR12, a third transistor TR13, a fourth transistor TR4, and a fifth transistor TR15, a first current source 210, a second current source 220, and a switch SW. For example, the first transistor TR11, the second transistor TR12, and the fifth transistor TR15 may be NMOS transistors, and the third transistor TR13 and the fourth transistor TR14 may be PMOS transistors. However, the present disclosure is not limited thereto. The first transistor TR11, the second transistor TR12, the third transistor TR13, the fourth transistor TR14, and the fifth transistor TR15 may be implemented with transistors whose types are different from those illustrated in FIG. 6.

Referring to FIG. 6, the ramp signal RAMP may be input to a gate terminal of the first transistor TR11, and the pixel signal PIX may be input to a gate terminal of the second transistor TR12. Source terminals of the first transistors TR11 and second transistors TR12 may be connected in common with the first current source 210 and the switch SW at a common node COMM. For example, the third transistors TR13 and fourth transistors TR14 may be connected in the form of a current mirror. A sum of currents flowing to the first transistors TR11 and second transistors TR12 may be equal to a power current ISS1.

A gate terminal and a drain terminal of the third transistor TR13 and a drain terminal of the first transistor TR11 may be connected in common with a second output node OUT12, and a drain terminal of the fourth transistor TR14 and a drain terminal of the second transistor TR12 may be connected in common with a first output node OUT11. The fifth transistor TR15 may be connected between the first output nodes OUT11 and second output nodes OUT12. For example, the fifth transistor TR15 may limit a voltage level of a signal that is output from the first output node OUT11.

The first output signal OTA1_OUT may be output from the first output node OUT11. For example, in a period where a level of the ramp signal RAMP is higher than a level of the pixel signal PIX, the first output signal OTA1_OUT may have the high level. In a period where the level of the ramp signal RAMP is lower than the level of the pixel signal PIX, the first output signal OTA1_OUT may have the low level. The first output signal OTA1_OUT may be provided to the second amplifier 151_2 of FIG. 5.

The first current source 210 is configured to output and may output a first sub power current ISS11. The second current source 220 is configured to output and may output a second sub power current ISS12 when the switch SW is turned on and may not operate when the switch SW is turned off. That is, when the switch SW is turned on, the power current ISS1 may be equal to a sum of the first sub power current ISS11 and the second sub power current ISS12. When the switch SW is turned off, the power current ISS1 may be equal to only the first sub power current ISS11.

For example, when the first amplifier 200*a* performs the comparison operation for the low conversion gain pixel signal, the switch SW may be turned off such that only the first current source 210 operates. Accordingly, the power current ISS1 may be equal to the first sub power current ISS11. In contrast, when the first amplifier 200*a* performs the comparison operation for the high conversion gain pixel signal, the switch SW may be turned on such that both the first current source 210 and the second current source 220 operate. Accordingly, the power current ISS1 may be equal to a sum of the first sub power current ISS11 and the second sub power current ISS12.

For example, magnitudes of the first sub power current ISS11 and the second sub power current ISS12 may be differently determined depending on a magnitude of the shot noise. In addition, a ratio of the first sub power current ISS11 and the second sub power current ISS12 may be optimized in the process of designing the first amplifier 200*a*. Also, the switch SW may be turned on or turned off in response to a signal that is deactivated when the comparison operation for the low conversion gain pixel signal is performed and is activated when the comparison operation for the high conversion gain pixel signal is performed. As such, the current consumption in the dual conversion gain operation may be optimized through the operation of the first amplifier 200*a*, and the current consumption in the comparison operation for the low conversion gain pixel signal may decrease. This may mean that the power consumption of the ADC circuit 150 decreases.

An embodiment in which the power current of the first amplifier 151_1 of FIG. 5 is adjusted while the comparison operation for the low conversion gain pixel signal is performed is described with reference to FIG. 6, but the present disclosure is not limited thereto. For example, the power current of the first amplifier 151_1 may be adjusted in a method that is different from that described with reference to FIG. 6. Also, the power current of the second amplifier 151_2 of FIG. 5 may be differently adjusted in the comparison operation for the low conversion gain pixel signal and the comparison operation for the high conversion gain pixel signal.

Figure 7A:
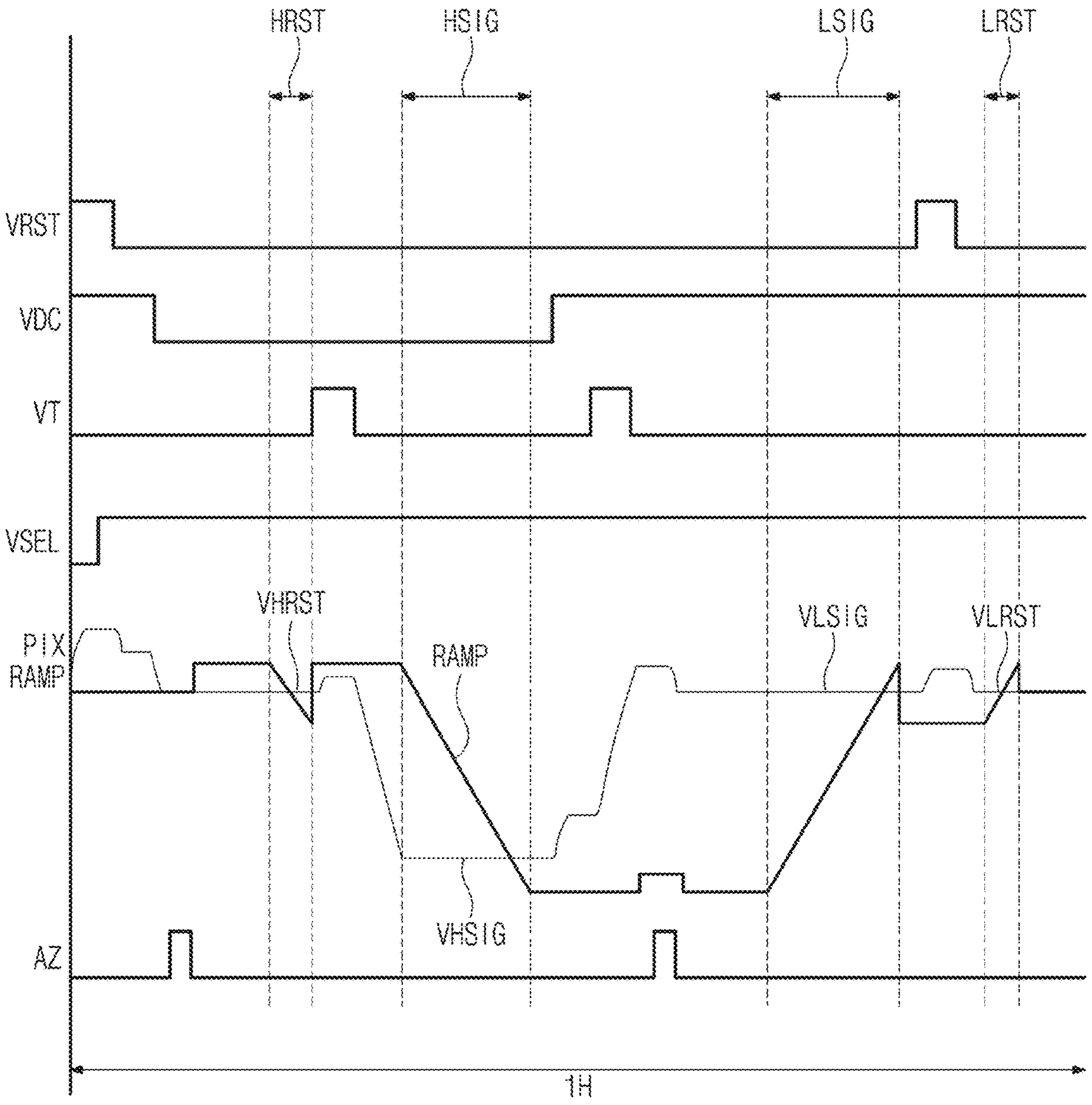
FIG. 7A is a timing diagram illustrating a process in which an ADC circuit of the analog-to-digital converting circuit of FIG. 5 processes a pixel signal depending on a reset-sig-sig-reset (RSSR) method.
Figure 7B:
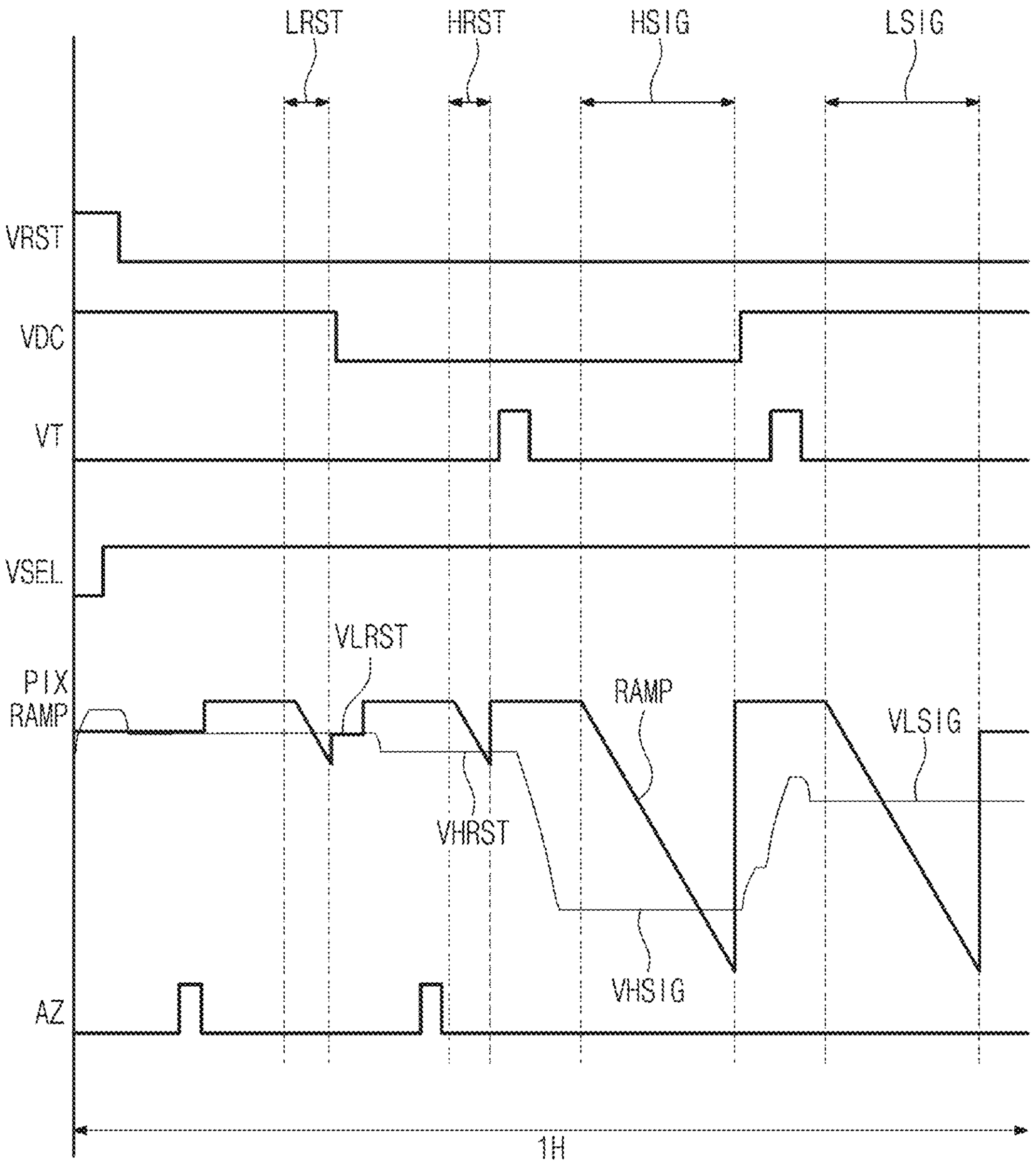
FIG. 7B is a timing diagram illustrating a process in which an ADC circuit of the analog-to-digital converting circuit of FIG. 5 processes a pixel signal depending on a reset-reset-sig-sig (RRSS) method.

FIG. 7A is a timing diagram illustrating a process in which the ADC circuit 150 of the analog-to-digital converting circuit of FIG. 5 processes the pixel signal PIX depending on a reset-sig-sig-reset (RSSR) method. FIG. 7B is a timing diagram illustrating a process in which the ADC circuit 150 of the analog-to-digital converting circuit of FIG. 5 processes the pixel signal PIX depending on a reset-reset-sig-sig (RRSS) method. Below, FIG. 7A and FIG. 7B will be described together with FIG. 5.

A 1H time period is illustrated in FIG. 6A and FIG. 6B. The 1H time period may refer to a time that should be essentially secured to drive a plurality of pixels of the pixel array 110 in units of row. For example, the 1H time period may include a high conversion gain reset signal period HRST, a high conversion gain image signal period HSIG, a low conversion gain reset signal period LRST, and a low conversion gain image signal period LSIG.

Referring to FIG. 7A, the high conversion gain reset signal period HRST, the high conversion gain image signal period HSIG, the low conversion gain image signal period LSIG, and the low conversion gain reset signal period LRST may progress sequentially (Reset-Sig-Sig-Reset: RSSR).

A high conversion gain reset signal VHRST, a high conversion gain image signal VHSIG, a low conversion gain image signal VLSIG, and a low conversion gain reset signal VLRST may be respectively output in the plurality of periods HRST, HSIG, LSIG, and LRST as components of the pixel signal PIX, so as to be sequentially converted into digital signals.

First, the reset signal VRST of a logic high level is applied to the gate of the reset transistor RST, and the reset signal VRST of a logic low level is then applied to the gate of the reset transistor RST. Next, the adjustment between the voltage level of the ramp signal RAMP and the voltage level of the pixel signal PIX may be made in response to the auto-zero signal AZ. Then, the dual conversion signal VDC of the logic low level may be applied to the gate of the dual conversion transistor DC. Accordingly, the high conversion gain reset signal VHRST may be output in the high conversion gain reset signal period HRST. Afterwards, the transfer signal VT of the logic high level may be applied to the gate of the transfer transistor Tx. Accordingly, the high conversion gain image signal VHSIG may be output in the high conversion gain image signal period HSIG.

Next, the adjustment between the voltage level of the ramp signal RAMP and the voltage level of the pixel signal PIX may be again made in response to the auto-zero signal AZ. As the reset signal VRST of the logic low level is applied to the gate of the reset transistor RST, the dual conversion signal VDC of the logic high level is applied to the gate of the dual conversion transistor DC, and the transfer signal VT of the logic high level is applied to the gate of the transfer transistor Tx, the low conversion gain image signal VLSIG may be output in the low conversion gain image signal period LSIG. Afterwards, the reset signal VRST of the logic high level may be applied to the gate of the reset transistor RST. Accordingly, the low conversion gain reset signal VLRST may be output in the low conversion gain reset signal period LRST.

Referring to FIG. 7B, the low conversion gain reset signal period LRST, the high conversion gain reset signal period HRST, the high conversion gain image signal period HSIG, and the low conversion gain image signal period LSIG may progress sequentially (Reset-Reset-Sig-Sig: RRSS).

First, the reset signal VRST of the logic high level is applied to the gate of the reset transistor RST, and the reset signal VRST of the logic low level is then applied to the gate of the reset transistor RST. Next, the adjustment between the voltage level of the ramp signal RAMP and the voltage level of the pixel signal PIX may be made in response to the auto-zero signal AZ. Then, the dual conversion signal VDC of the logic high level may be applied to the gate of the dual conversion transistor DC, and thus, the low conversion gain reset signal VLRST may be output in the low conversion gain reset signal period LRST. After the adjustment between the voltage level of the ramp signal RAMP and the voltage level of the pixel signal PIX is again made in response to the auto-zero signal AZ, the dual conversion signal VDC of the logic low level may be applied to the gate of the dual conversion transistor DC. Accordingly, the high conversion gain reset signal VHRST may be output in the high conversion gain reset signal period HRST.

Afterwards, the transfer signal VT of the logic high level may be applied to the gate of the transfer transistor Tx. Accordingly, the high conversion gain image signal VHSIG may be output in the high conversion gain image signal period HSIG. As the dual conversion signal VDC of the logic high level is applied to the gate of the dual conversion transistor DC and the transfer signal VT of the logic high level is applied to the gate of the transfer transistor Tx, the low conversion gain image signal VLSIG may be output in the low conversion gain image signal period LSIG.

Figure 8A:
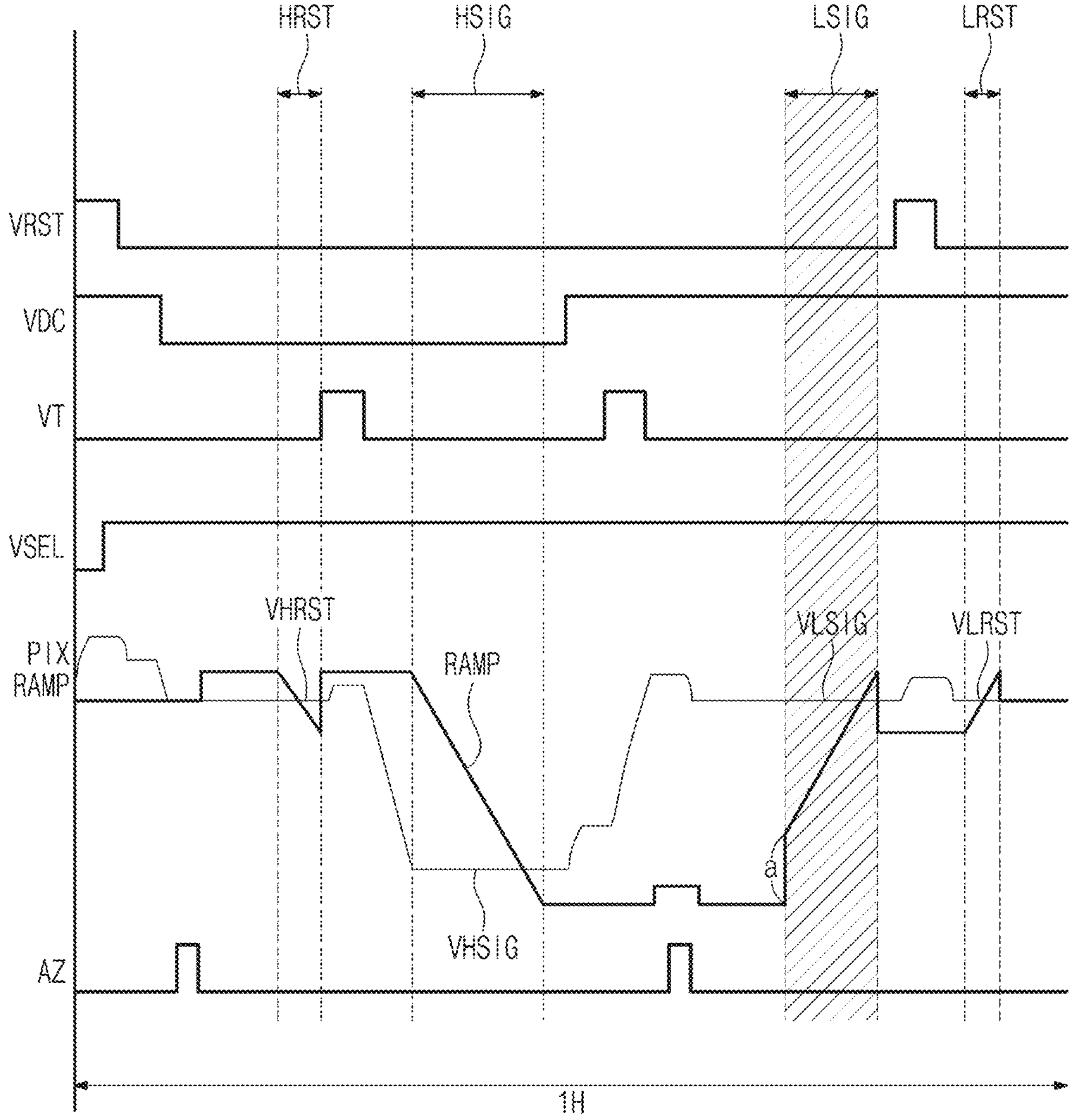
FIG. 8A illustrates an example in which the offset of the ramp signal RAMP is adjusted in the timing diagram of FIG. 7A.
Figure 8B:
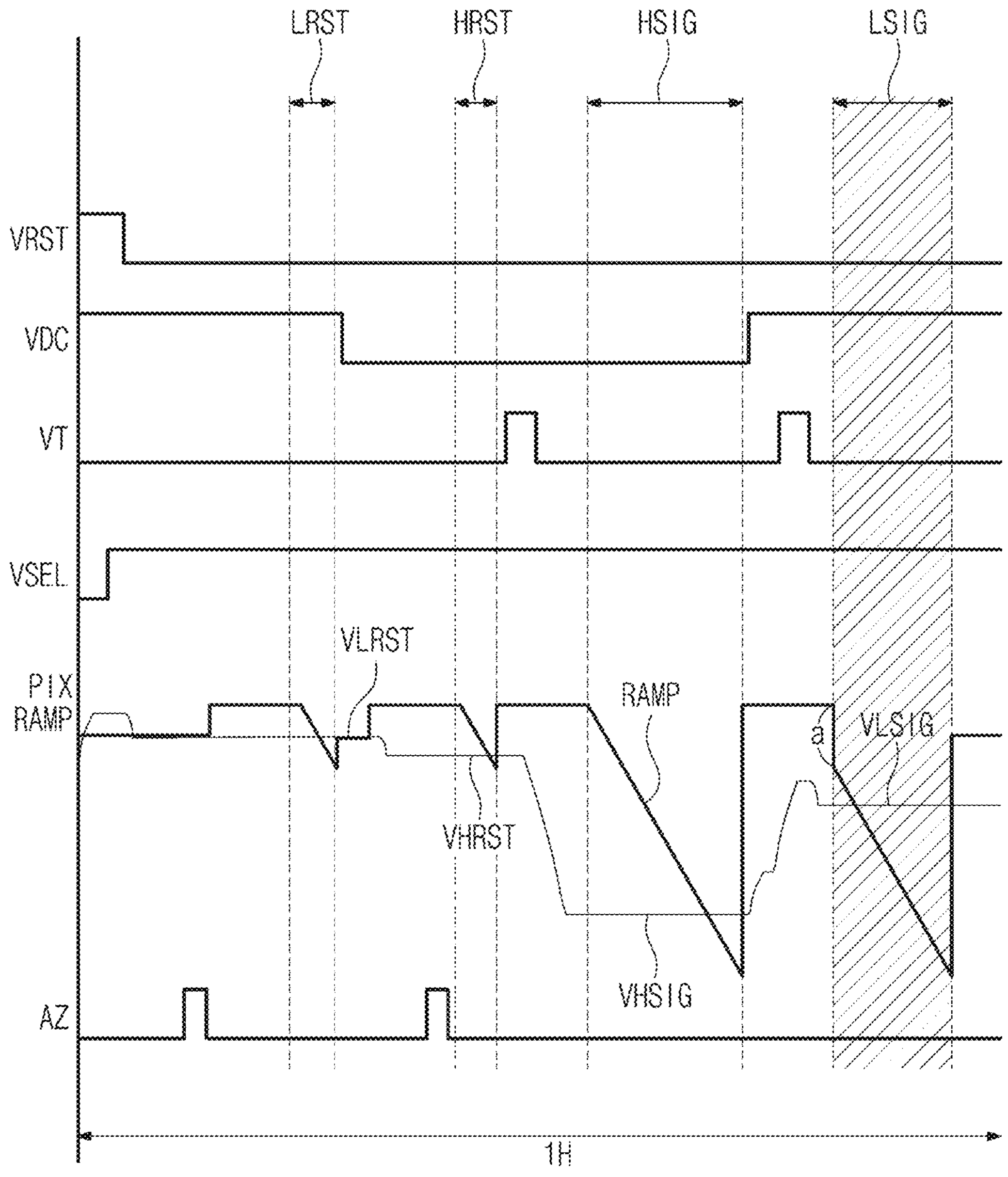
FIG. 8B illustrates an example in which the offset of the ramp signal RAMP is adjusted in the timing diagram of FIG. 7B.

FIG. 8A illustrates an example in which the offset of the ramp signal RAMP is adjusted in the timing diagram of FIG. 7A, and FIG. 8B illustrates an example in which the offset of the ramp signal RAMP is adjusted in the timing diagram of FIG. 7B. As described above, when the shot noise is sufficiently large, the quality of the image data may not be significantly affected even if the comparison operation on the low conversion gain pixel signal is not completely performed. In this case, during the LSIG period, the ramp signal generator (e.g., 130 of FIG. 2) may omit a part of counting by either increasing the offset of the ramp signal RAMP by "a" as in FIG. 8A or decreasing by "a" as in FIG. 8B. For example, the ramp signal generator 130 may determine the amount "a" of the offset to increase or decrease based on the ratio of the low conversion gain and the high conversion gain.

Referring to FIG. 8A, as the offset of the ramp signal RAMP increases by "a" in the LSIG section compared to FIG. 7A, some of the comparison operation and counting between the low conversion gain image signal VLSIG and the ramp signal RAMP may be omitted. Accordingly, the length of the LSIG interval of FIG. 9A may be shorter than the length of the LSIG interval of FIG. 7A, and the length of the 1H time interval of FIG. 8A may also be shorter than the length of the 1H time interval of FIG. 7A.

Referring to FIG. 8B, as the offset of the ramp signal RAMP is reduced by "a" in the LSIG section compared to FIG. 7B, some of the comparison operation and counting between the low conversion gain image signal VLSIG and the ramp signal RAMP may be omitted. Similarly, the length of the LSIG interval of FIG. 8B may be shorter than the length of the LSIG interval of FIG. 7B, and the length of the 1H time interval of FIG. 8B may also be shorter than the length of the 1H time interval of FIG. 7B.

Figure 8C:
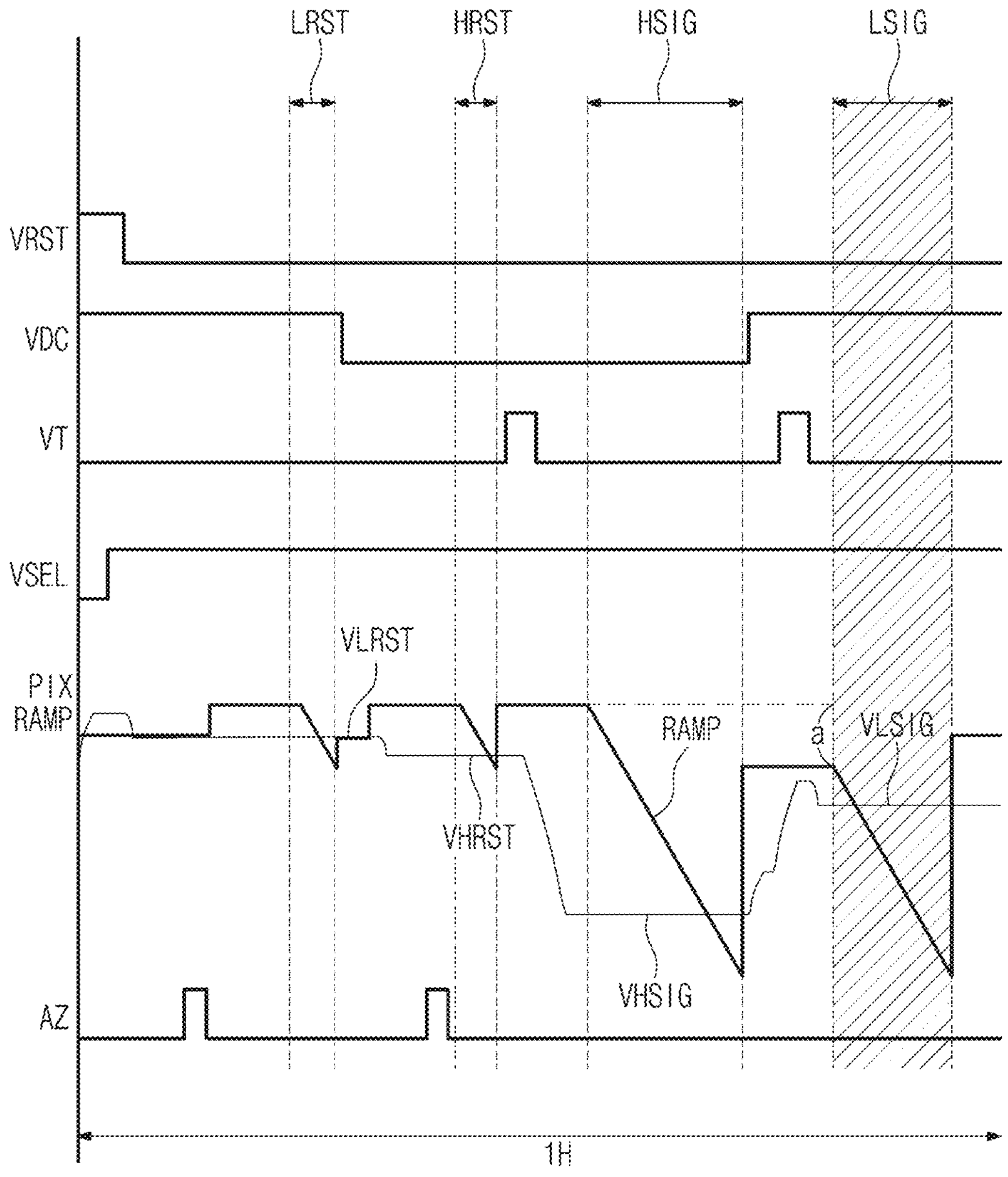
FIG. 8C illustrates another example in which the offset of the ramp RAMP is adjusted in the timing diagram of FIG. 7B.

Meanwhile, FIG. 8C illustrates another example in which the offset of the ramp signal RAMP is adjusted in the timing diagram of FIG. 7B. Referring to FIG. 8C, the level of the ramp signal RAMP after the HSIG interval ends may be adjusted to be lower than the level of the ramp signal RAMP after the LRST interval or the HRST interval ends (for example, to be lowered by a). Accordingly, as shown in FIG. 8B, the same effect as that the offset of the ramp signal RAMP is decreased by a in the LSIG interval may be obtained, and some of the comparison operation and counting between the low conversion gain image signal VLSIG and the ramp signal RAMP may be omitted. Accordingly, the length of the LSIG interval of FIG. 8C may be shorter than the interval of the LSIG period of FIG. 7B, and the length of the 1H time interval of FIG. 8C may also be shorter than the length of the 1H time interval of FIG. 7B. Through the above-described operations, a time required for the dual conversion gain operation may be reduced.

Figure 9:
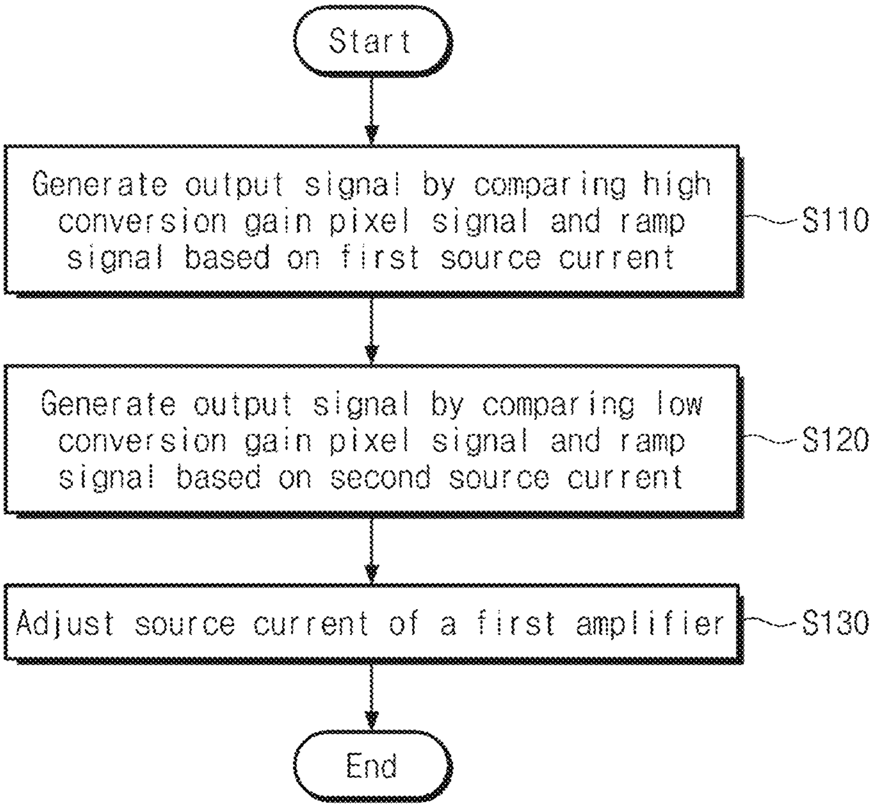
FIG. 9 is a flowchart illustrating an operation method of an analog-to-digital converting (ADC) circuit for optimizing a dual conversion gain operation according to an embodiment of the present disclosure.

FIG. 9 is a flowchart illustrating an operation method of an analog-to-digital converting (ADC) circuit for optimizing a dual conversion gain operation according to an embodiment of the present disclosure. Below, FIG. 9 will be described together with FIG. 5.

In operation S110, the first amplifier 151_1 may generate an output signal by comparing a ramp signal and a high conversion gain pixel signal corresponding to a high conversion gain condition based on a first power current. In operation S120, the first amplifier 151_1 may generate the output signal by comparing the ramp signal and a low conversion gain pixel signal corresponding to a low conversion gain condition based on a second power current.

In operation S130, the first amplifier 151_1 may adjust a power current. For example, the second power current of the first amplifier 151_1 corresponding to the low conversion gain condition may be adjusted to be smaller than the first power current of the first amplifier 151_1 corresponding to the high conversion gain condition. To adjust the power current depending on the conversion gain, the first amplifier 151_1 may be implemented as illustrated in FIG. 6.

According to an embodiment of the present disclosure, the power consumption of an analog-to-digital converting circuit may be optimized by differently setting current consumption in a low conversion gain operation and current consumption in a high conversion gain operation.

Also, according to an embodiment of the present disclosure, a time taken to perform a dual conversion gain operation may be optimized by differently setting a ramp signal in the low conversion gain operation and a ramp signal in the high conversion gain operation.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A circuit, comprising:

a first transistor configured to receive a first pixel signal corresponding to a first conversion gain and a second pixel signal corresponding to a second conversion gain;

a second transistor configured to receive a first ramp signal and a second ramp signal;

a first current source connected with a first source terminal of the first transistor and a second source terminal of the second transistor at a common node, and configured to output a first sub power current;

a switch connected with the first source terminal and the second source terminal at the common node; and a second current source connected with the switch, and configured to output a second sub power current, wherein the first conversion gain is higher than the second conversion gain, wherein a first power current of the circuit when the first pixel signal and the first ramp signal are compared is different from a second power current of the circuit when the second pixel signal and the second ramp signal are compared.

2. The circuit of claim 1, wherein:

the first transistor is connected between a first node and the common node, and operates in response to the first pixel signal and the second pixel signal, and the second transistor is connected between an output node and the common node, and operates in response to the first ramp signal and the second ramp signal.

3. The circuit of claim 2, further comprising:

a third transistor connected between the first node and a power node; and a fourth transistor connected between the output node and the power node, wherein a gate node of the third transistor is connected to the first node, wherein the gate node of the third transistor and a gate node of the fourth transistor are connected to each other.

4. The circuit of claim 3, further comprising:

a fifth transistor connected between the gate node of the third transistor and the output node, wherein a gate node of the fifth transistor is connected to the gate node of the fourth transistor.

5. The circuit of claim 1, wherein:

the first current source is connected between the common node and a ground node, and the second current source is connected between one end of the switch, which is not connected to the common node, and the ground node.

6. The circuit of claim 1, wherein:

the first current source generates the first sub power current, the second current source generates the second sub power current, and the first power current is generated by the switch being turned on, and the first power current is equal to sum of the first sub power current and the second sub power current.

7. The circuit of claim 6, wherein the second power current is generated by the switch being turned off, and the second power current is equal to the first sub power current.

8. The circuit of claim 6, wherein the switch is turned on, when the first transistor receives the first pixel signal and the second transistor receives the first ramp signal.

9. An operation method of an amplifier comprising:

receiving a pixel signal, wherein the pixel signal includes a first pixel signal corresponding to a first conversion gain, and a second pixel signal corresponding to a second conversion gain;

receiving a ramp signal, wherein the ramp signal includes a first ramp signal and a second ramp signal;

comparing the pixel signal and the ramp signal; and generating output signal based on the comparing, wherein:

the first conversion gain is higher than the second conversion gain, and a first power current of the amplifier when the first pixel signal and the first ramp signal are compared is different from a second power current of the amplifier when the second pixel signal and the second ramp signal are compared.

10. The operation method of claim 9, the amplifier comprising:

a first current source connected between a common node and a ground node, and configured to generate a first sub power current, a second current source of which one end is connected to the ground node, and configured to generated a second sub power current, and a switch connected between the common node, and an opposite end of the second current source.

11. The operation method of claim 10, wherein, when the first pixel signal and the first ramp signal are compared, the switch is turned on, and the first power current is equal to a sum of the first sub power current and the second sub power current.

12. The operation method of claim 10, wherein, when the second pixel signal and the second ramp signal are compared, the switch is turned off, and the second power current is equal to the first sub power current.

13. The operation method of claim 10, wherein the amplifier further comprising:

a first transistor configured to operate in response to the pixel signal; and a second transistor configured to operate in response to the ramp signal, wherein a first source terminal of the first transistor is connected with a second source terminal of the second transistor at the common node.

14. The operation method of claim 13, wherein the amplifier further comprising:

a third transistor connected between a first node and a power node; and a fourth transistor connected between an output node and the power node, wherein a gate node of the third transistor is connected to the first node, wherein the gate node of the third transistor and a gate node of the fourth transistor are connected to each other.

15. The operation method of claim 9, wherein the comparing the pixel signal and the ramp signal comprises:

comparing a reset signal of the first pixel signal and the first ramp signal in a first operation period;

comparing an image signal of the first pixel signal and the first ramp signal in a second operation period;

comparing an image signal of the second pixel signal and the second ramp signal in a third operation period; and comparing a reset signal of the second pixel signal and the second ramp signal in a fourth operation period.

16. The operation method of claim 15, wherein the second ramp signal is an increasing ramp signal during the third operation period, and an offset of the second ramp signal increases when the third operation period starts.

17. The operation method of claim 16, wherein an offset signal of the first ramp signal is increased based on a ratio of the first conversion gain and the second conversion gain when the third operation period starts, and wherein the second ramp signal is adjusted to increase during the third operation period.

18. The operation method of claim 9, wherein the comparing the pixel signal and the ramp signal comprises:

comparing a reset signal of the second pixel signal and the second ramp signal in a first operation period;

comparing a reset signal of the first pixel signal and the first ramp signal in a second operation period;

comparing an image signal of the first pixel signal and the first ramp signal in a third operation period; and comparing an image signal of the second pixel signal and the second ramp signal in a fourth operation period.

19. The operation method of claim 18, wherein the second ramp signal is a decreasing ramp signal during the fourth operation period, and an offset of the second ramp signal decreases when the fourth operation period starts.

20. The operation method of claim 19, wherein the offset of the second ramp signal is decreased based on a ratio of the first conversion gain and the second conversion gain when the fourth operation period starts, and wherein the second ramp signal is adjusted to decrease during the fourth operation period.

* * * * *